US009453964B2

(12) United States Patent
Barnes et al.

(10) Patent No.: US 9,453,964 B2
(45) Date of Patent: Sep. 27, 2016

(54) STRIPPING APPARATUS AND METHODS FOR OPTICAL FIBERS

(71) Applicant: Corning Optical Communications LLC, Hickory, NC (US)

(72) Inventors: Brandon Andrew Barnes, Fort Worth, TX (US); Joshua Douglas Raker, Lewisville, TX (US); Kevin Lee Strause, Keller, TX (US)

(73) Assignee: Corning Optical Communications LLC, Hickory, NC (US)

( * ) Notice: Subject to any disclaimer, the term of this patent is extended or adjusted under 35 U.S.C. 154(b) by 115 days.

(21) Appl. No.: 14/192,049

(22) Filed: Feb. 27, 2014

(65) Prior Publication Data
US 2014/0238208 A1 Aug. 28, 2014

Related U.S. Application Data

(60) Provisional application No. 61/770,669, filed on Feb. 28, 2013.

(51) Int. Cl.
*G02B 6/24* (2006.01)
*G02B 6/245* (2006.01)
*B23P 19/02* (2006.01)
*G02B 6/25* (2006.01)

(52) U.S. Cl.
CPC .............. *G02B 6/245* (2013.01); *G02B 6/25* (2013.01); *Y10T 29/49821* (2015.01); *Y10T 29/5103* (2015.01); *Y10T 83/0467* (2015.04); *Y10T 83/9292* (2015.04); *Y10T 225/218* (2015.04)

(58) Field of Classification Search
CPC ........ G02B 6/245; G02B 6/25; B26D 1/305; Y10T 83/9396; Y10T 83/9399; Y10T 83/9401; Y10T 83/9292; Y10T 83/02; Y10T 29/5102; Y10T 29/5103; Y10T 29/49194; Y10T 29/49821; Y10T 225/218; Y10T 225/217
See application file for complete search history.

(56) References Cited

U.S. PATENT DOCUMENTS

| 4,106,377 A * | 8/1978 | Owen Jr. ............. H02G 1/1256 409/336 |
| 4,745,828 A * | 5/1988 | Stepan ................... G02B 6/245 81/9.42 |
| 4,852,244 A | 8/1989 | Lukas ........................... 29/566.3 |
| 4,920,830 A * | 5/1990 | Stepan ................... G02B 6/245 81/9.42 |
| 4,981,054 A * | 1/1991 | Stepan ................... G02B 6/245 81/9.42 |
| 5,050,302 A | 9/1991 | Mills ............................. 30/90.8 |
| 5,111,720 A * | 5/1992 | Stepan ................... G02B 6/245 81/9.42 |
| 5,253,412 A | 10/1993 | Fukuoka et al. ............ 29/566.3 |
| 5,389,192 A * | 2/1995 | Takimoto ............... G02B 6/245 156/764 |
| 5,443,536 A * | 8/1995 | Kiritsy ................... G02B 6/245 30/90.4 |
| 5,596,802 A * | 1/1997 | Koch ................... H02G 1/1265 29/720 |
| 6,079,297 A * | 6/2000 | Chandler ............... G02B 6/245 30/90.4 |

(Continued)

FOREIGN PATENT DOCUMENTS

| DE | 4038414 A1 | 6/1992 | ............. G02B 6/245 |
| EP | 2722696 A2 * | 4/2014 | ............. G02B 6/245 |

(Continued)

*Primary Examiner* — Essama Omgba

(57) ABSTRACT

Apparatus and methods for stripping tight-buffered optical fibers are disclosed. The apparatus is configured to perform one or more of the functions of stripping a tight buffer layer, removing a coating layer, and cleaving the fiber, in a single motion.

19 Claims, 8 Drawing Sheets

(56) References Cited

U.S. PATENT DOCUMENTS

| | | | | |
|---|---|---|---|---|
| 6,099,392 A * | 8/2000 | Wiegand | B24B 19/226 | 225/2 |
| 6,122,936 A * | 9/2000 | Csipkes | G02B 6/2551 | 65/485 |
| 6,190,057 B1 * | 2/2001 | Osaka | G02B 6/245 | 385/134 |
| 6,273,990 B1 | 8/2001 | Bookbinder et al. | | 156/344 |
| 6,286,393 B1 * | 9/2001 | Messer | H02G 1/1265 | 81/9.41 |
| 6,321,621 B1 * | 11/2001 | Stepan | G02B 6/245 | 81/9.42 |
| 6,360,430 B1 * | 3/2002 | Stepan | H02G 1/1265 | 29/33 F |
| 6,643,448 B1 * | 11/2003 | Brewer | G02B 6/245 | 30/90.1 |
| 6,668,128 B2 * | 12/2003 | Hattori | G02B 6/245 | 385/134 |
| 6,816,662 B2 * | 11/2004 | Doss | G02B 6/25 | 385/134 |
| 6,823,761 B2 * | 11/2004 | Chiang | G02B 6/245 | 81/9.41 |
| 6,978,071 B2 * | 12/2005 | Hwang | G02B 6/245 | 225/21 |
| 6,983,534 B2 * | 1/2006 | Zeibig | H02G 1/1295 | 29/825 |
| 7,103,253 B2 * | 9/2006 | Mizuno | G02B 6/245 | 385/134 |
| 7,391,951 B2 * | 6/2008 | Hayashi | G02B 6/25 | 385/134 |
| 8,092,100 B2 * | 1/2012 | Song | G02B 6/245 | 385/134 |
| 8,503,850 B2 * | 8/2013 | Mazzali | G02B 6/245 | 385/134 |
| 8,509,587 B2 * | 8/2013 | Song | G02B 6/245 | 385/134 |
| 8,831,391 B2 * | 9/2014 | Suematsu | G02B 6/245 | 385/123 |
| 9,291,773 B2 * | 3/2016 | Harrison | G02B 6/245 | |
| 2002/0064354 A1 * | 5/2002 | Ware | G02B 6/245 | 385/95 |
| 2002/0064355 A1 * | 5/2002 | Ware | G02B 6/245 | 385/95 |
| 2002/0130152 A1 * | 9/2002 | Cripps, Jr. | G02B 6/25 | 225/105 |
| 2002/0145731 A1 * | 10/2002 | Kritler | G02B 6/245 | 356/73.1 |
| 2004/0055161 A1 * | 3/2004 | Chiang | G02B 6/245 | 30/90.4 |
| 2004/0120678 A1 * | 6/2004 | Hwang | G02B 6/245 | 385/134 |
| 2005/0002632 A1 * | 1/2005 | Mizuno | G02B 6/245 | 385/134 |
| 2008/0282522 A1 * | 11/2008 | Song | G02B 6/245 | 29/33.52 |
| 2010/0215318 A1 | 8/2010 | Suematsu et al. | | 385/60 |
| 2012/0125166 A1 | 5/2012 | Hallett et al. | | 83/13 |
| 2014/0245875 A1 * | 9/2014 | Harrison | G02B 6/245 | 83/861 |

FOREIGN PATENT DOCUMENTS

| | | | | |
|---|---|---|---|---|
| GB | 2472256 A * | 2/2011 | | G02B 6/245 |
| JP | 5-323126 | 12/1993 | | G02B 6/00 |
| JP | 2000-193831 | 7/2000 | | G02B 6/00 |
| WO | WO 2010028127 A1 * | 3/2010 | | G02B 6/245 |
| WO | WO 2011087942 A1 * | 7/2011 | | G02B 6/245 |
| WO | WO 2013119745 A1 * | 8/2013 | | G02B 6/245 |

* cited by examiner

STRIPPING APPARATUS AND METHODS FOR OPTICAL FIBERS

RELATED APPLICATIONS

This application claims the benefit of priority under 35 U.S.C. §119 of U.S. Provisional Application Ser. No. 61/770,669, filed on Feb. 28, 2013, the content of which is relied upon and incorporated herein by reference in its entirety.

FIELD

The present disclosure relates to stripping of optical fibers, and in particular to apparatus and methods for stripping optical fibers.

BACKGROUND

There are several products that require fiber optic cables to be prepared in the field (including mechanical connectors and fusion splicers). This preparation includes prepping the cable down to bare 125 µm fiber and then cleaving so that the glass can be used. These steps typically include stripping the 250 µm acrylate coating, cleaning the debris created by that stripping, placing the now bare glass into a mechanical cleaver, performing the cleave on the fiber, and then disposing of the scrap fiber.

Conventional methods require multiple tools to perform each preparation steps. There are stripping tools that also require a cleaning step on the fiber. There are stripping tools that handle the cleaning while stripping. There are also cleaving tools that cleave cleaned bare glass but do not dispose of the scrap. There are further cleaving tools that cleave cleaned bare glass and do dispose of the scrap. Each of the conventional devices have mechanical, use, and cost differences which make each of them preferable in certain situations. However, none is capable of performing all required steps in ideally one action.

SUMMARY

One embodiment of this disclosure is stripping apparatus having a housing and blade assembly at least partially disposed within an interior of the housing. The blade assembly includes at least one coating blade arranged to remove a fiber coating and at least one cleave blade arranged to cleave the fiber.

According to another embodiment of this disclosure, a stripping apparatus for tight-buffered fibers includes a housing having an interior and at least one ramp disposed within the interior. The stripping apparatus also includes a blade assembly at least partially disposed within the housing interior. The blade assembly, which is translatable along a longitudinal axis of the housing, has at least one blade shuttle section, at least one coating blade supported by the at least one blade shuttle section, at least one buffer blade supported by the at least one blade shuttle section, and at least one cleave blade arranged to cleave the fiber. The at least once coating blade and the at least one buffer blade are movable relative to the at least one blade shuttle section and respectively configured to remove a fiber coating and a tight buffer of the fiber. Additionally, the at least one coating blade and the at least one buffer blade are configured to contact the at least one ramp in the interior of the housing during translation of the blade assembly to move relative to the at least one blade shuttle section.

Methods of preparing a fiber are also provided. According to one embodiment of this disclosure, a method involves providing a stripping apparatus having a housing and blade assembly. The blade assembly includes at least one coating blade and at least one cleave blade. The method also involves inserting a fiber into the stripping apparatus and translating the blade assembly relative to the housing, whereby the latter causes the at least one coating blade to strip a coating off the fiber and causes the at least one cleave blade to cleave the fiber.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

Embodiments of this disclosure are addressed to a tool that performs multiple fiber preparation steps in one device. This device can perform, for example, at least four steps for fiber preparation. The device can strip the coating (e.g., 250 µm coating), strip the tight buffer layer (e.g., 900 µm), from the fiber, clean the fiber sufficiently for use in a mechanical splice, and cleave the fiber to a usable stub length for a mechanical splice, in a single motion. The device can also include a mechanism for disposing of scrap fiber. The device may use, for example, a closed stripper jaw to remove the 250 µm coating while cleaning the fiber, and may use the stripping action and the resistance caused by it to produce a tension force that will propagate a score mark and create a usable cleaved endface. Alternatively, the device can fix end of fiber to provide tension force. The blade assembly can be pivoted open when extended from the housing to allow disposal of scrap generated during the stripping and cleaving operations.

Figure 1A:
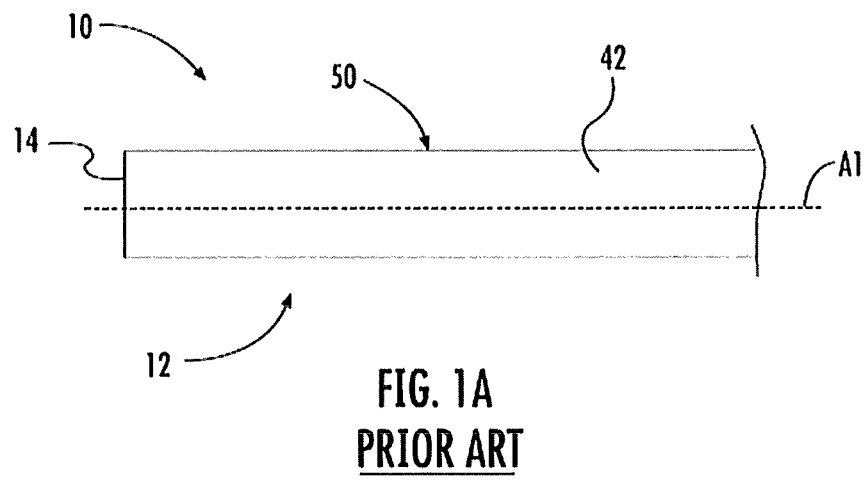
FIG. 1A is a side view of an end portion of an example tight-buffered optical fiber ("buffered fiber") 10 and FIG. 1B is a cross-sectional view of the buffered fiber of FIG. 1A.
Figure 1B:
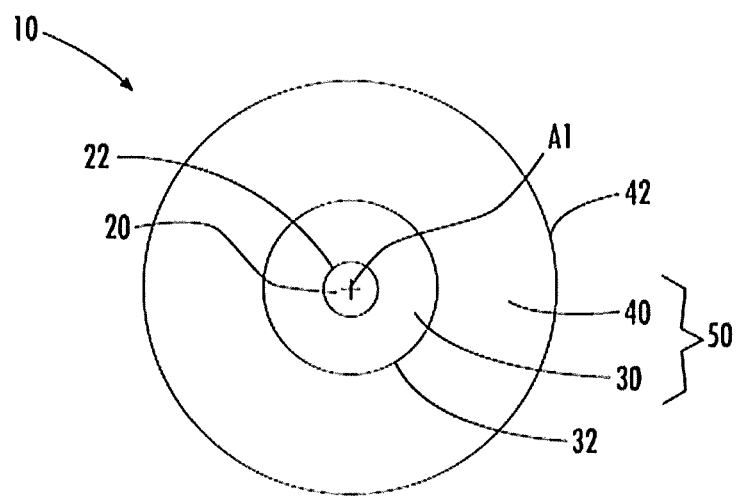

FIG. 1A is a side view of an end portion of an example tight-buffered optical fiber ("buffered fiber") 10 and FIG. 1B is a cross-sectional view of the buffered fiber of FIG. 1A. Buffered fiber 10 has a central axis A1 and an end portion 12 that includes an end 14. Buffered fiber 10 includes a glass fiber 20 having an outer surface 22, which is immediately surrounded by a coating layer ("coating") 30 having an outer surface 32. Coating 30 is immediately surrounded at its outer surface 32 by buffer layer ("buffer") 40 having an outer surface 42. Coating 30 and buffer 40 define a protective cover 50 for glass fiber 20. The coating 30 may be, for example, and 250 μm coating, and the tight buffer layer 40 can be, for example, a 900 μm tight buffer.

Figure 2:
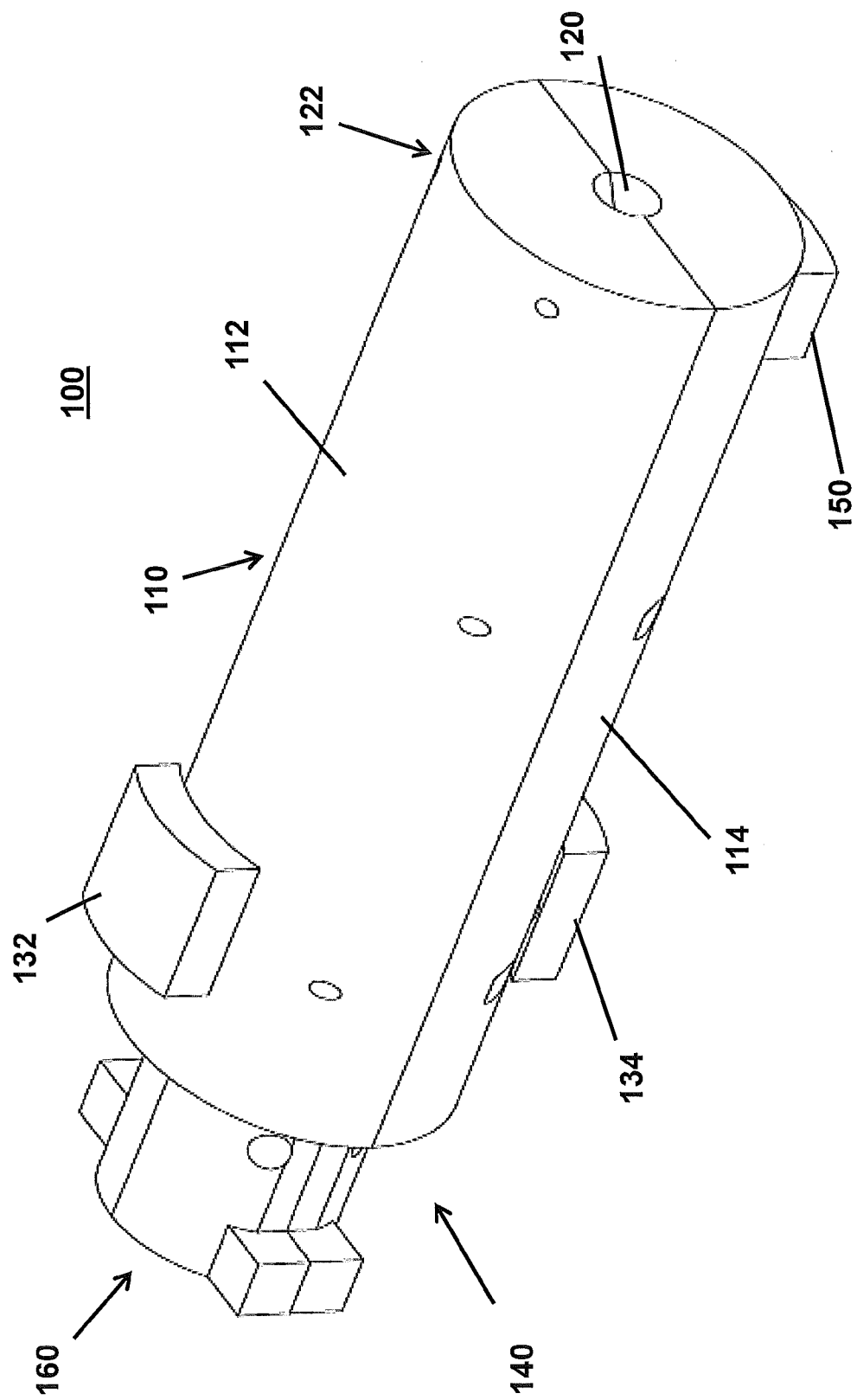
FIG. 2 is a perspective view of an example stripping device according to one embodiment.

FIG. 2 is a perspective view of an example stripping device 100 designed for stripping a portion of buffered fiber 10. The device 100 includes a housing 110 comprised of a first housing section 112 and a second housing section 114, and has an insertion aperture 120 at an insertion end 122 of the housing 110. An activation button 132 is disposed in the first housing section 112, and an activation button 134 is disposed in the second housing section 114, at a second end 140 of the housing 110. A load button 150 is disposed in the second housing section 114 at the insertion end 122. A blade assembly 160 extends from the second end 140 and into the interior of the housing 110. As shown in FIG. 2, the housing 110 has a generally cylindrical outer profile.

Figure 3:
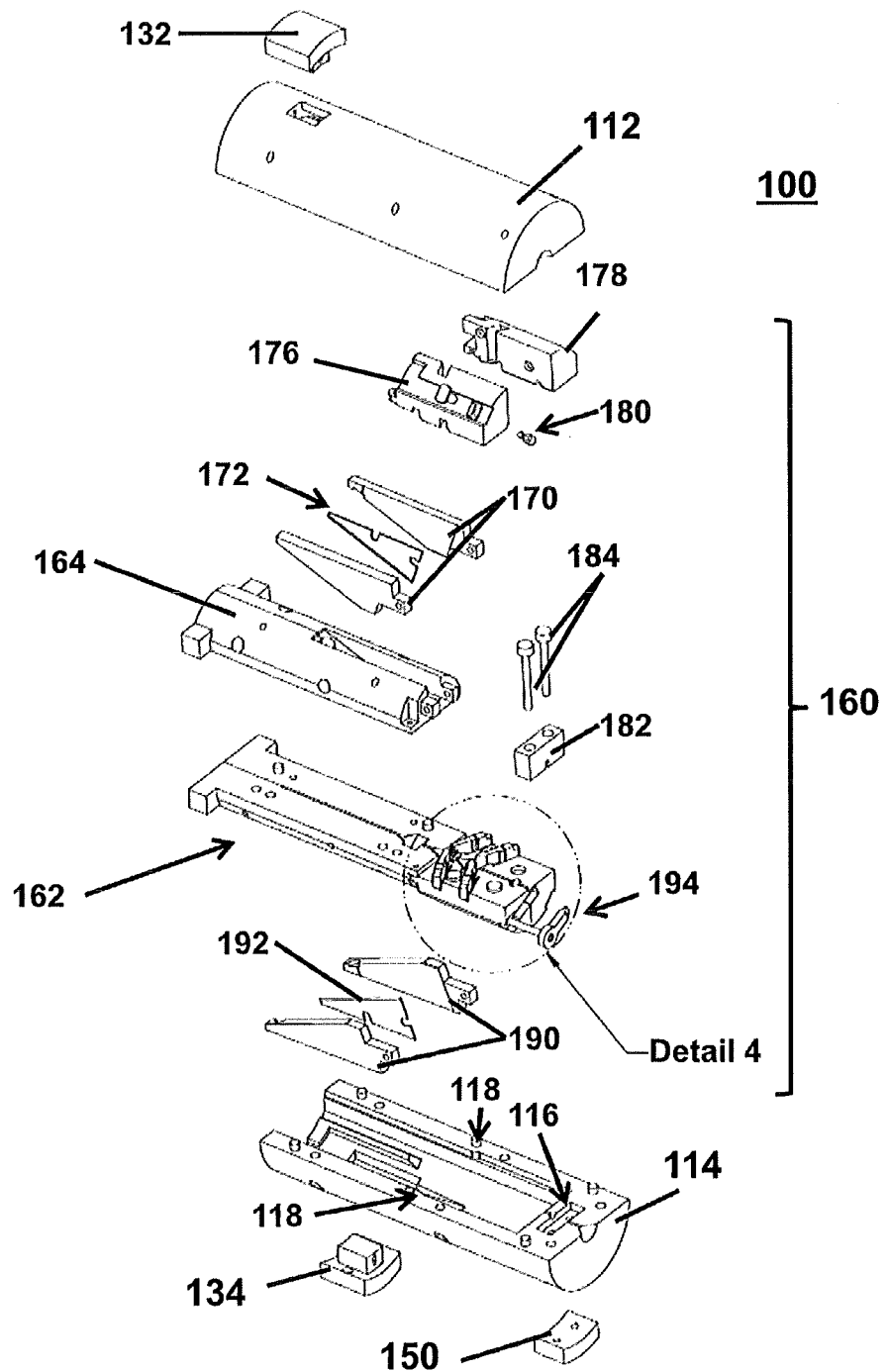
FIG. 3 is an exploded view of the stripping device.

FIG. 3 is an exploded view of the stripping device 100. The blade assembly 160 comprises a first blade shuttle section 162 and a second blade shuttle section 164, two blade carriers 170 between which a lengthwise blade 172 is disposed, a first strip blade carrier 176 and a second strip blade carrier 178, a fiber tensioner 180, a cable clamp 182, and cable clamp pins 182. A pair of blade carriers 190 has a lengthwise blade 192 disposed therebetween. The second housing section 114 has an aperture 116 in which a cleave blade 194 rotates, and ramps 118 that close buffer blades 196, 198 (FIG. 4) and coating blades 202, 204. The blade assembly 160 extends through the interior of the housing 100 and can be configured to be slidably mounted therein.

Figure 4:
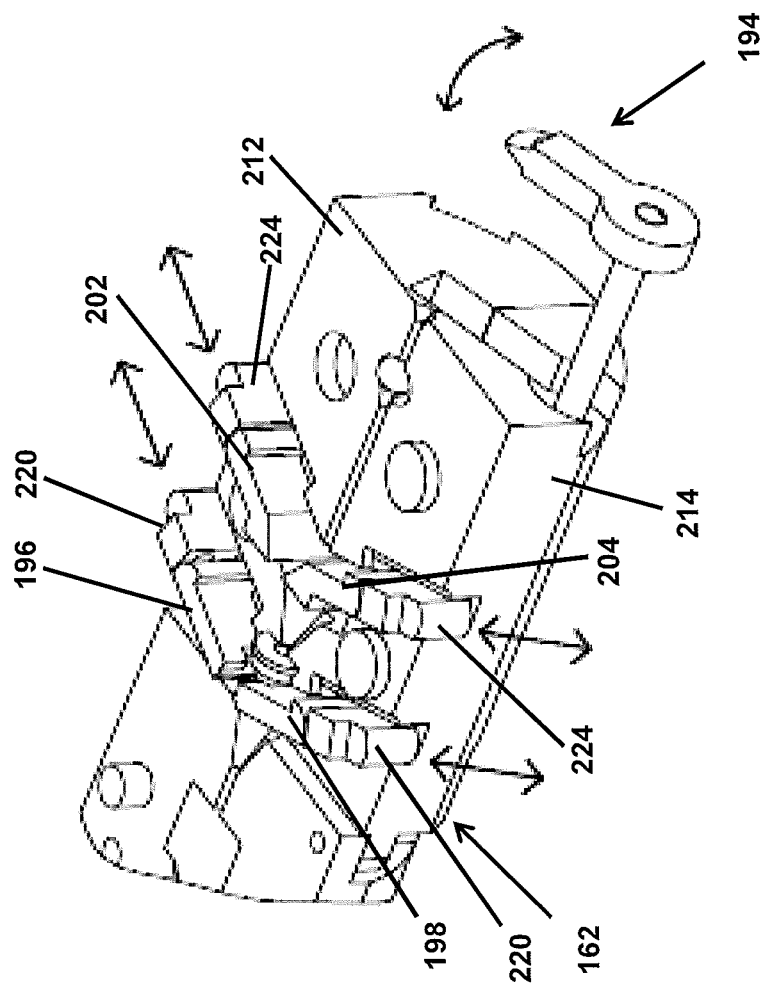
FIG. 4 is a detailed view of from FIG. 3.

FIG. 4 is a detailed view of Detail 4 from FIG. 3. FIG. 4 illustrates the portion of the blade assembly 160 comprising the first blade shuttle section 162, including buffer blades 196, 198, coating blades 202, 204, strip blade carriers 212, 214, cleave blade 194, buffer blade spring blocks 220, and coating blade spring blocks 224.

Figure 5:
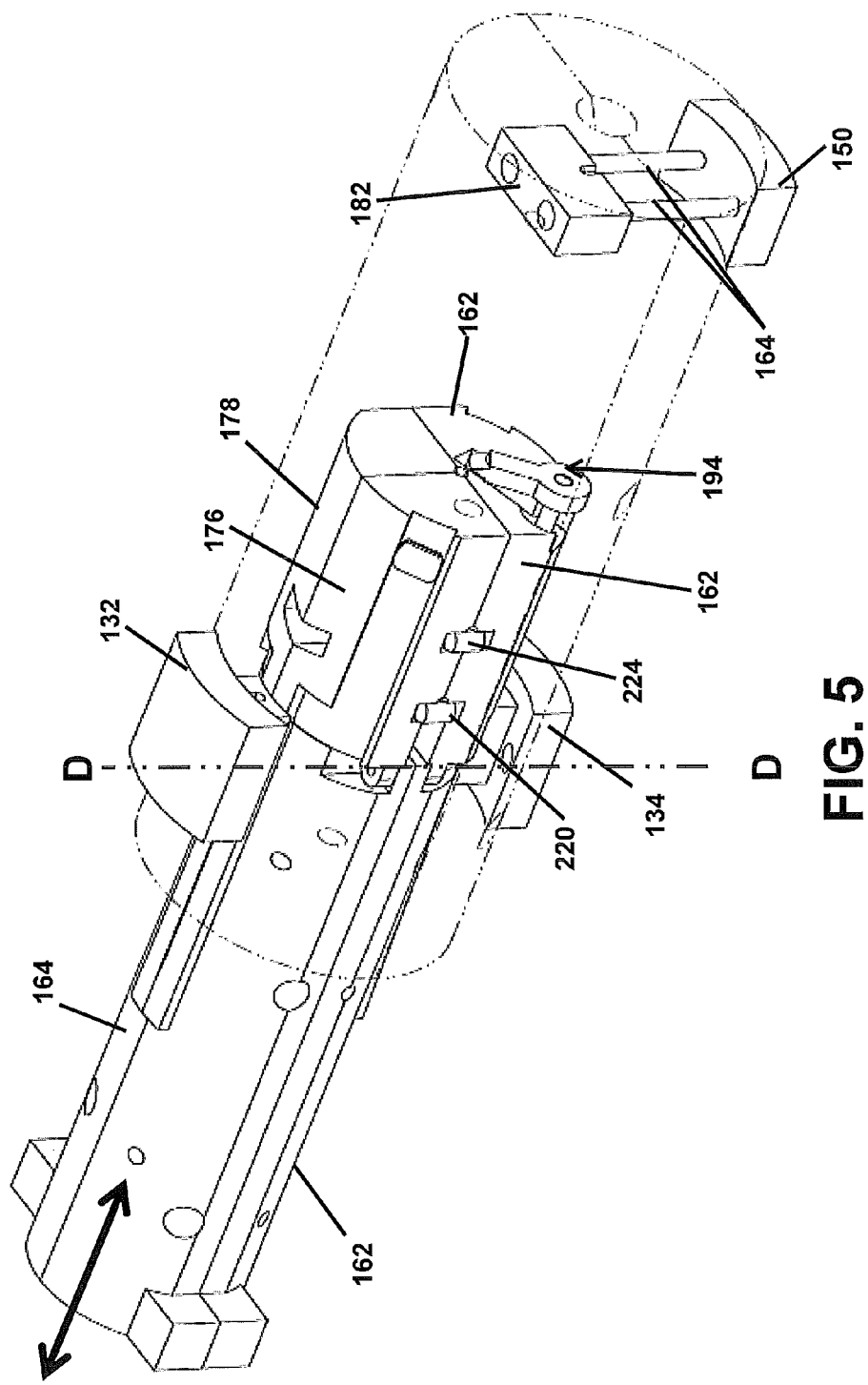
FIG. 5 illustrates the stripping device with the housing transparent.

FIG. 5 illustrates the stripping device 100 with the housing 110 removed.

Figure 6:
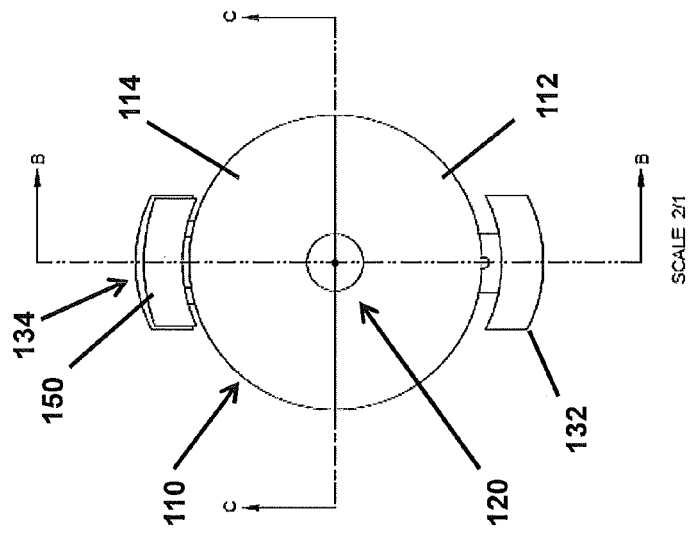
FIG. 6 is an end view of the stripping device.

FIG. 6 is an end view of the stripping device 100.

Figure 7:
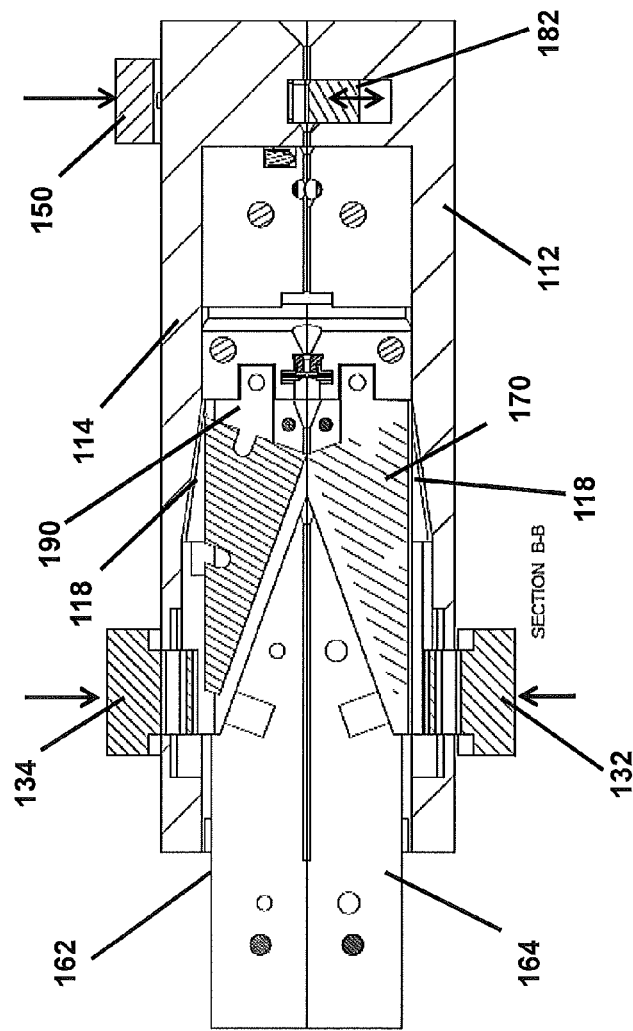
FIG. 7 is a longitudinal section view of the stripping device taken on line B-B in FIG. 6.

FIG. 7 is a longitudinal section view of the stripping device 100 taken on line B-B in FIG. 6.

Figure 8:
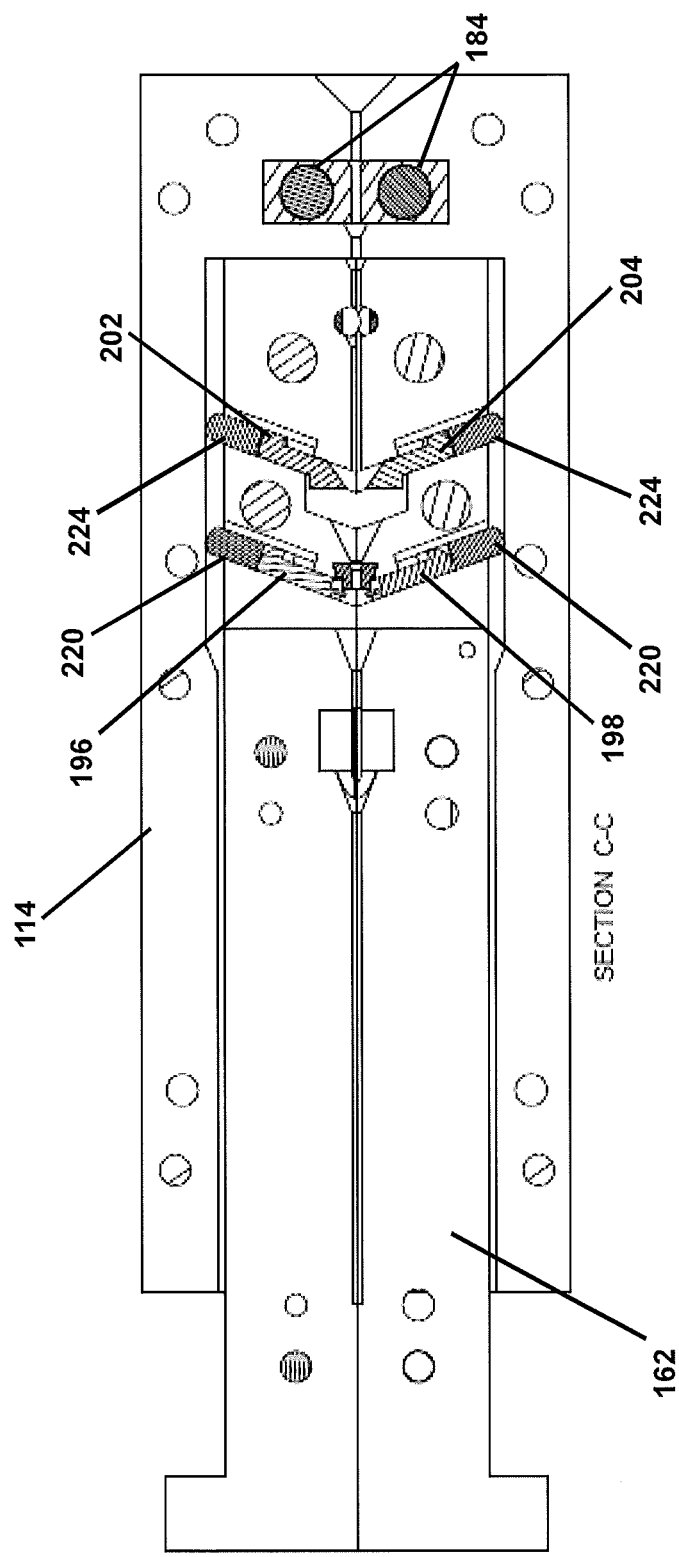
FIG. 8 is a longitudinal section view of the stripping device taken on line C-C in FIG. 6.

FIG. 8 is a longitudinal section view of the stripping device 100 taken on line C-C in FIG. 6.

Figure 9:
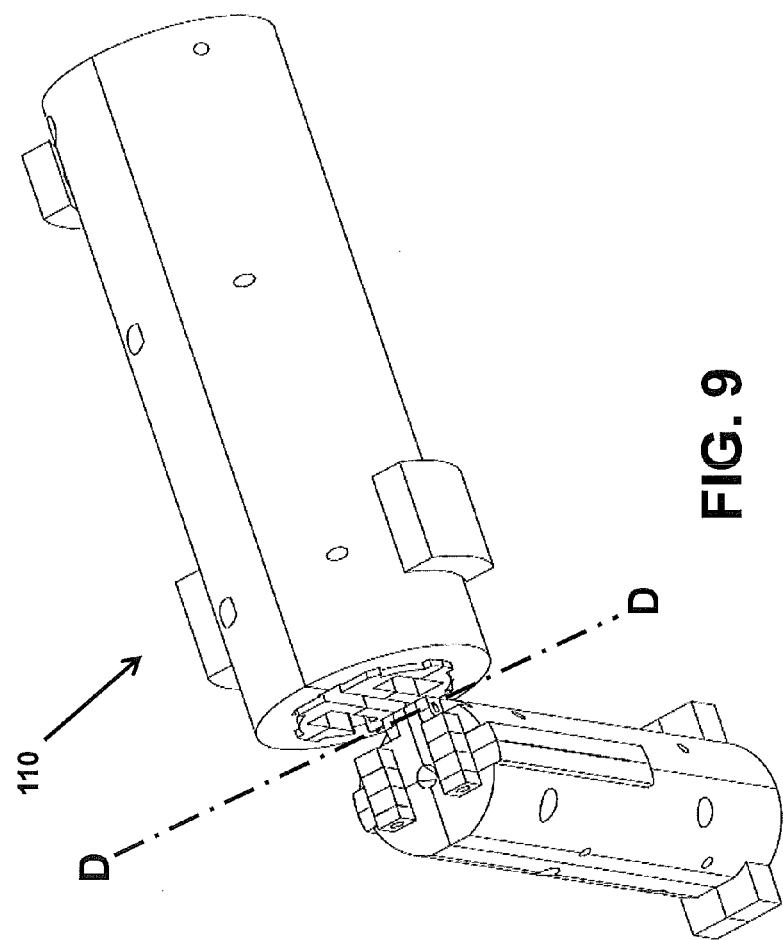
FIG. 9 illustrates the stripping device when disposing of scrap generated during stripping and cleaving.

FIG. 9 illustrates the stripping device 100 when disposing of scrap generated during stripping and cleaving. Scrap from the stripping and cleaving can be removed from the device 100 by pulling the blade assembly 160 out of housing 100, and pivoting the apparatus about the pivot line D-D.

The function and operation of the stripping device is as follows. The housing 110 provides a housing for the interior components and guides/locates their positions, as well as providing the user with something to hold during use. The housing 110 is shown as formed from two housing sections 112, 114, but a single piece could be used. The load button 150 allows the installer to open the clamp 182 such that a 900 um tight buffered cable may be inserted.

Blade carriers 170, 190 sandwich the blades 172, 192 into position on the top and bottom to allow the blades 172, 192 to slice the 900 um tight buffer lengthwise. The elements are spring-loaded relative to the blade assembly 160 (in a location opposite the cross holes—springs not shown). The activation buttons 132, 134 push on these blade carriers 170, 190 to bring the blades 172, 192 into contact with the fiber buffer layer on the top and bottom, for example, the 3:00 and 9:00 positions.

The lengthwise blades 172, 192 slice the 900 μm tight buffer along the length as the blade assembly 160 is pulled. The purpose of this slicing is to yield the integrity/hoop strength of the tight buffer, thus making it much easier to strip off.

Blade assembly 160 houses the mechanisms for stripping and cleaving. The blade assembly 160 also moves in a linear motion along the main axis of the tool (see arrow in FIG. 5), thus allowing the stripping and cleaving elements to move into and away from the cable/fiber. The blade assembly 160 is shown as having two main shuttle sections 162, 164, but will move through the housing 110 as a single piece.

Cable clamp 182 holds the 900 μm tight buffer layer of the fiber in position during stripping and cleaving. The cable clamp 182 is arranged so that the fiber withstands the tension that is developed in both the stripping and cleaving processes, without damaging the tight buffer layer or the fiber coating. The cable clamp 182 is spring-loaded "closed" (springs not shown). The load button 150 (FIG. 7) compresses the springs to release the fiber clamp 182 to allow insertion of a 900 um tight buffered cable. Cable clamp pins 184 guide and locate the cable clamp 182. Cable clamp 182 springs (not shown) are disposed on the pins 184 to bias the clamp 182.

The strip blade carriers 176, 178 provide location and allow translation (arrows shown in FIG. 5) for the buffer blades 196, 198 and coating blades 202, 204 so that the buffer blades 196, 198 and coating blades 202, 204 can engage the tight buffer and coating layers, respectively. The ramps 118 push the buffer blades 196, 198 and coating blades 202, 204 inwardly during stripping as the blade assembly 160 is pulled toward the second end 140 of the stripping apparatus 100.

The fiber tensioners 180 are spring loaded relative to the strip blade carriers 176, 178 to provide tension in the bare glass in order to adequately propagate a flaw formed by the cleave blade 194 into an acceptable cleave. Tension is present in the glass at the time the flaw is introduced. A "tension only" fixing of the fiber is disclosed in the present embodiment, however a bending motion can be added to the fiber if needed. The activation buttons 132, 134 push the buffer blades 196, 198 (via the blade carriers 176, 178) into contact with the 900 tight buffered fiber.

The buffer blades 196, 198 circumferentially cut the 900 um tight buffer layer and remove it (via linear motion of the blade assembly 160). The buffer blades 196, 198 are spring-loaded "open" and are driven into contact via ramps 118 inside the outer housing 110. The coating blades 202, 204 circumferentially cut the 250 um tight buffer layer and remove it as the blade assembly 160 is pulled toward the second end 140 of the device. The coating blades 202, 204 are spring-loaded "open" and are driven into contact via ramps 118 inside the outer housing 110 as the blade assembly 160 translates through the housing. The buffer and coating blade spring blocks 220, 224 effect movement of the buffer blades 196, 198 and coating blades 202, 204 into cable contact as the blocks move over the ramps 118.

The cleave blade 194 introduces a flaw into bare glass that is under tension, thus resulting in a cleave. As embodied, the cleave blade 194 is capable of moving both along the blade assembly 160 axis and rotating such that it can contact the diameter of the bare glass (once exposed). The cleave blade 194 is initially "nested" in the blade assembly 160 and translates into the cleave position as the tight buffer and coatings are removed. The cleave blade 194 is in the "final" axial position just after the coatings are removed and rotates to contact/flaw the tensioned and now bare glass, thus initiating the cleave.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A stripping apparatus for tight-buffered fibers, comprising:
a housing having an interior; and
a blade assembly at least partially disposed within the interior of the housing, the blade assembly comprising:
at least one coating blade arranged to remove a fiber coating; and
at least one cleave blade arranged to cleave the fiber;
wherein the housing further includes at least one ramp in the interior, the blade assembly is translatable along a longitudinal axis of the housing and relative to the at least one ramp, and the at least one coating blade is configured to contact the at least one ramp during translation of the blade assembly relative to the at least one ramp.

2. The stripping apparatus of claim 1, wherein the blade assembly further comprises at least one buffer blade arranged to remove a tight buffer of the fiber.

3. The stripping apparatus claim 2, wherein the at least one coating blade comprises a pair of opposed coating blades, the at least one buffer blade comprise a pair of opposed buffer blades, and the at least one ramp comprises opposed ramps in the interior of the housing.

4. The stripping apparatus of claim 3, wherein the blade assembly further includes at least one blade carrier, the coating blades and buffer blades being translatably mounted within the at least one blade carrier.

5. The stripping apparatus of claim 4, wherein the buffer blades are configured to contact the opposed ramps during translation of the blade assembly.

6. The stripping apparatus of claim 4, wherein the at least one cleave blade is rotatably mounted in the blade assembly.

7. The stripping apparatus of claim 1, further comprising:
a clamp disposed on the blade assembly and biased to secure a fiber in place; and
at least one load button arranged to release the clamp and to allow a fiber to be inserted in the housing.

8. The stripping apparatus of claim 1, wherein the blade assembly comprises at least one lengthwise blade extending along a longitudinal axis of the stripping apparatus, the stripping apparatus further comprising:
at least one activation button arranged to engage the at least one lengthwise blade with the fiber.

9. The stripping apparatus of claim 1, wherein the at least one ramp comprises opposed ramps in the interior of the housing.

10. A stripping apparatus for tight-buffered fibers, comprising:
a housing having an interior and at least one ramp disposed within the interior; and
a blade assembly at least partially disposed within the housing interior, the blade assembly comprising:
at least one blade shuttle section;
at least one coating blade supported by the at least one blade shuttle section and configured to remove a fiber coating;
at least one buffer blade supported by the at least one blade shuttle section and configured to remove a tight buffer of the fiber; and
at least one cleave blade arranged to cleave the fiber;
wherein:
the at least once coating blade and the at least one buffer blade are movable relative to the at least one blade shuttle section;
the blade assembly is translatable along a longitudinal axis of the housing; and
the at least one coating blade and the at least one buffer blade are configured to contact the at least one ramp in the interior of the housing during translation of the blade assembly to move relative to the at least one blade shuttle section.

11. The stripping apparatus claim 10, wherein the at least one coating blade comprises a pair of opposed coating blades, the at least one buffer blade comprise a pair of opposed buffer blades, and the at least one ramp comprises opposed ramps within the interior of the housing.

12. The stripping apparatus of claim 10, wherein the blade assembly comprises at least one lengthwise blade extending along a longitudinal axis of the stripping apparatus, the stripping apparatus further comprising:
at least one activation button arranged to engage the at least one lengthwise blade with the fiber.

13. A method of preparing a fiber, comprising:
providing a stripping apparatus having a housing, and a blade assembly with at least one coating blade and at least one cleave blade;
inserting a fiber into the stripping apparatus; and
translating the blade assembly relative to the housing along a longitudinal axis of the housing, wherein translating the blade assembly causes the at least one coating blade to strip a coating off the fiber and causes the at least one cleave blade to cleave the fiber;
wherein translating the blade assembly causes a portion of the blade assembly to engage at least one ramp on the housing to effect movement of the at least one coating blade relative to the at least one ramp and toward the fiber.

14. The method of claim 13, wherein translating the blade assembly causes at least one buffer blade of the stripping apparatus to remove a buffer coating of the fiber.

15. The method of claim 14, wherein translating the blade assembly causes the portion of the blade assembly that engages the at least one ramp on the housing to effect movement of the at least one buffer blade toward the fiber.

16. The method of claim 13, wherein translating the blade assembly causes at least one lengthwise blade to cut a longitudinal surface of the fiber, the method further comprising:
pressing an activation button to engage the at least one lengthwise blade with the fiber.

17. The method of claim 13, further comprising pivoting the blade assembly open about a pivot point to dispose of scrap.

18. The method of claim 13, further comprising pressing a load button to release a clamp prior to inserting the fiber into the housing.

19. The method of claim 13, wherein translating the blade assembly comprises translating the blade assembly away from a first end of the housing where the fiber is inserted, toward a second end of the housing.

* * * * *